Oct. 5, 1971  B. ZIPPEL ET AL  3,610,073
DRIVE ARRANGEMENTS FOR A ROTARY TURNTABLE
Filed Feb. 20, 1970

INVENTORS
BERND ZIPPEL
ALFRED SCHLIECKMANN
BY  Nolte & Nolte
ATTORNEYS

United States Patent Office 3,610,073
Patented Oct. 5, 1971

3,610,073
DRIVE ARRANGEMENTS FOR A ROTARY TURNTABLE
Bernd Zippel, Langenhain, and Alfred Schlieckmann, Eschwege, Germany, assignors to Richard Zippel & Co. KG, Eschwege, Germany
Filed Feb. 20, 1970, Ser. No. 12,985
Claims priority, application Germany, Feb. 27, 1969, P 19 09 787.1
Int. Cl. B23q 17/02
U.S. Cl. 74—822                                      12 Claims

ABSTRACT OF THE DISCLOSURE

A pressure fluid operated drive arrangement for a rotary turntable, especially a rotary turntable carrying moulds in a mould filling plant, is disclosed. The arrangement comprises an endless belt, which is mounted on or otherwise coupled to the turntable and, by means of which, a succession of angular displacements are imparted to the turntable. The belt is displaced in synchronism with the forward displacement of a spring loaded piston in a cylinder. The piston is displaced in response to pressure fluid introduced into the cylinder and, during such forward displacement, the piston is coupled to the belt by means of pairs of pivotably displaceable clamps. These clamps are mounted on a trolley which is displaced under the influence of the piston, along a path substantially parallel to a portion of the belt engaged by the clamps. The clamps of each pair are mounted on either side of the belt and are so pivotally arranged and orientated that they are self-lockingly applied to the belt whilst the piston is displaced by the fluid pressure. After each forward stroke of the piston, the piston returns under the influence of its spring loading and, during this return movement, the clamps slide freely on the belt. Preferably, hydraulic braking means operate on the turntable, either directly or via the belt. The braking means are arranged to be so responsive to the fluid pressure for displacing the piston as to release the turntable prior to the forward stroke of the piston and to lock the turntable against rotation during the return stroke of the piston.

BACKGROUND OF THE INVENTION

The present invention relates to pressure fluid operated drive arrangements for rotary turntables, especially to turntables provided with casting moulds in a plant for producing mouldings from multi-component synthetic plastic materials.

In the past, the drive for turntables provided with casting moulds has been derived from electric or hydraulic brake motors. Mounted on the motor shaft is a gearwheel which engages in a large gearwheel disposed on the turntable. Such a drive becomes expensive not only by reason of the brake motor, but also by reason of the necessary gearwheels. It is necessary to provide turntables with a large periphery for use with turntable plants which are used in the manufacture of mouldings consisting of multiple components synthetic plastic materials. This is because the mould filling plant completes one ejection every 3 to 30 seconds, according to the size of the mould and, after only a brief interval, the next ejection must take place to avoid the synthetic plastic, which is becoming viscous, adhering to the mould filling plant. If the plant is to operate continuously under these conditions, the diameter of the turntable must be considered. In particular with small moulds, a large ring gear on the turntable is necessary so that the displacements of successive moulds relative to the nozzle of the mould filling plant may be accurately adjusted in spite of play in the gearing. Large ring gears are, however, only produced with very great difficulty, are extremely difficult to transport and are moreover extremely expensive.

The use of brake motors has the further disadvantage that, when moulds of different widths are used on the periphery of the turntable, considerable distances must be left between small moulds because the plants are designed only for the same angular increments of rotation and it is only with extreme difficulty that they can be produced to provide different angular increments.

The use of switching pawls for driving turntables is also linked with similar disadvantages, the toothed switching wheels must be of large dimensions. Moreover, the provision of suitable braking for the turntables is not simple. The use of Maltese crosses for the drive gives rise to difficulties in the manufacture of the large ring gear for the indexing pins with sufficient accuracy.

SUMMARY OF THE INVENTION

According to the present invention there is provided a drive arrangement for rotating a turntable, comprising a rotatable turntable coupled to an endless belt of material, a piston reciprocally displaceable within a cylinder, the piston being displaced in a first direction in response to fluid pressure and being displaced in a direction opposite to the first direction by piston return means, clamping members for engaging the belt and coupled to the piston to cause the turntable to be angularly displaced in response to displacement of the piston in the first direction.

Preferably, the endless belt is attached to the turntable and is disposed substantially concentrically of the centre of rotation of the turntable.

The endless belt may be an unmachined piece of flat iron bent into a circle. By reason of the low accuracy required, this annular belt can be welded together from a plurality of parts at the site where the turntable is assembled, without any re-adjustment of the circular form being required. Despite this, a high degree of accuracy is obtained. The annular belt may be disposed on the extreme outermost periphery of the turntable, so as to maximise the accuracy of the angular displacement of the turntable.

Preferably, the brake shoes of the braking means are drawn together by springs and spread apart by a further operating cylinder and piston arrangement. The pressure medium supply line for the braking means is connected to the pressure medium line leading to the cylinder and piston for providing the turntable displacement between the source of pressure medium and a restriction provided on the upstream side of the last mentioned cylinder.

Thus, a single pressure pulse in the pressure medium supply line is sufficient first to open the brake shoes and then to carry out the feed movement.

Advantageously, an electro-mechanically operated release valve is disposed in the pressure medium supply line between the pressure medium source and the restriction, by which the pressure medium supply line can be connected to the pressure medium return line or to the free atmosphere. The valve is responsive to an electrical signal generated by sensing means when the turntable is located in each of a plurality of predetermined positions. Thus, closure of the release valve causes the brakes to be released and, subsequently, the turntable to be angularly displaced. However, when the release valve is operated an immediate braking and interruption of the displacement of the turntable occurs. In this way, each angular displacement of the turntable may be accurately adjusted.

Preferably, the sensing means comprises a light beam which is periodically broken by parts of the turntable or by moulds mounted on the turntable. A light beam sensing means is particularly advantageous because, if the beam is disposed vertically, it becomes very simple to predetermine the moment when the beam is broken to coincide with the entry of each individual mould into the path of the light beam.

Preferably, the clamping members are mounted on a trolley which is periodically displaced along a portion of rail of approximately the same curvature as the portion of the belt engaged by the clamping members.

Preferably, the clamping members are individually pivotally mounted and are arranged in pairs, the clamping members of each pair being drawn together by springs. The clamping members are so orientated as to be self-lockingly applied against opposite walls of the belt when the turntable is angularly displaced. During the return stroke of the piston to which the clamping members are coupled, the clamping members slip loosely on the belt. If the clamping device is constructed in this way, then a feed of high accuracy is achieved even if the belt is not perfectly circular, since the individual clamping members pivot so as to maintain contact with the belt.

BRIEF DESCRIPTION OF THE DRAWINGS

An embodiment of the present invention will now be more particularly described with reference to the accompanying drawings, in which.

DESCRIPTION OF THE PREFERRED EMBODIMENT

Figure 1:
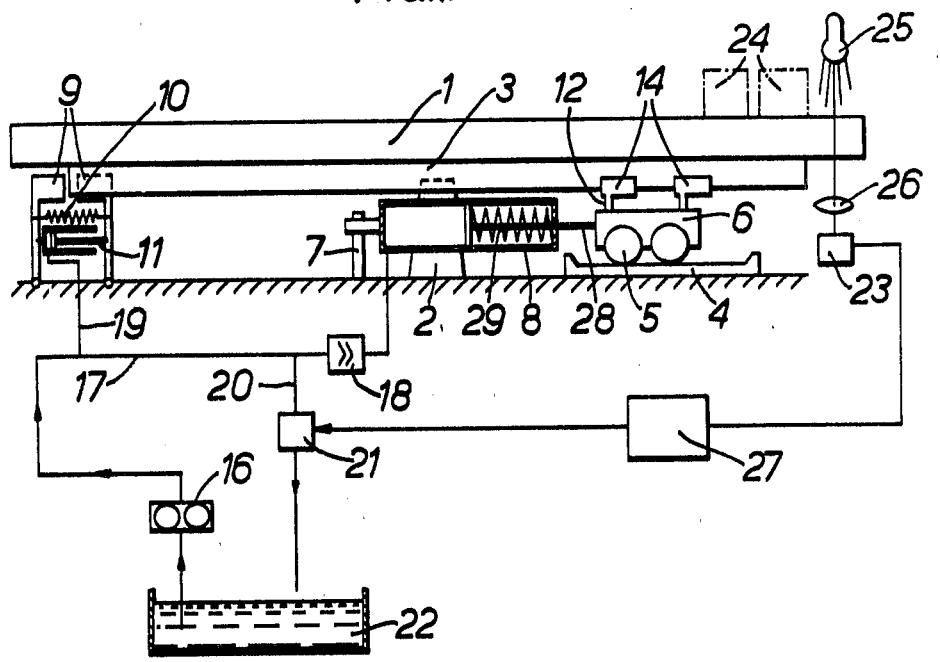
FIG. 1 is a side view of a pressure fluid operated driving arrangement embodying the invention.
Figure 2:
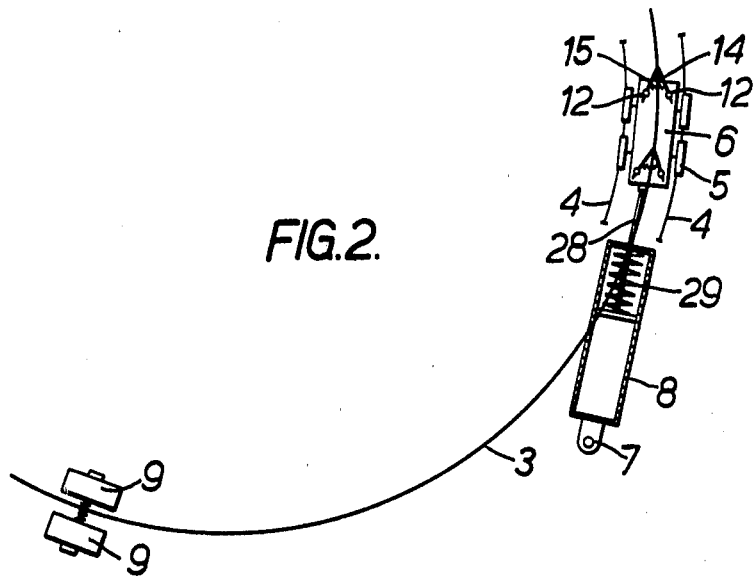
FIG. 2 is a plan view of the drive arrangement when the turntable has been removed.

Referring now to the drawings, a turntable 1 is mounted on a support 2. On its underside, the turntable 1 is provided with a non-machined annular belt 3 made from bent flat iron. A trolley 6 is displaceably mounted, by means of wheels 5, on rails 4. A piston 28 is reciprocally displaceable in a hydraulic cylinder 8, which pivots about a pin 7. The piston 28 transmits displacement to the trolley 6, which reciprocates synchronously with the piston 28. The piston is displaced in response to fluid pressure against a return spring 29. Brake shoes 9 are urged into a contact with the walls of the belt 3 by a spring 10. The brake shoes 9 may be spread apart so as to disengage the belt 3 by means of a hydraulic brake releasing device 11. Attached to the trolley 6 are pin members 12, on which pivot cam like clamping members 14. The clamping members 14 are drawn together by means of springs 15 to grip the side walls of the belt 3. Since these clamps 14 point in the direction of movement of the belt 3, they clamp the belt 3 only when the displacement of the trolley 6 is in the direction of rotation of the belt 3. The force exerted by each of the springs 15 is so chosen that, upon the return movement of the trolley 6, the clamps 14 do not grip the side walls of the belt 3 sufficiently firmly to overcome the braking force exerted on the belt 3 by jaws of the brake shoes 9.

Pressure fluid, such as oil, is delivered under pressure into the pipe 17 by means of an hydraulic pump 16. The pressure fluid in the pipe 17 passes through a constriction 18 to the cylinder 8. A branch pipe 19 branches off the pipe 17 upstream of the constriction 18 and leads to the hydraulic brake releasing device 11 operating on the brake shoes 9. A further branch pipe 20 branches off upstream of the constriction 18 and the flow of pressure fluid through the pipe 20 is controlled by means of an electromechanically operated valve 21; the branch pipe 20 leads to a reservoir 22, from which the pressure fluid is pumped by the pump 16.

In response to an electrical initiating pulse, the electromechanically operated valve 21 closes the branch pipe 20, through which fluid from the pump 16 was previously able to pass without pressure into the reservoir 22. Closure of the valve 21 causes fluid pressure to build up in the branch pipe 20 and in the pipe 17. The pressure of the fluid in the brake releasing means 11 causes the brake shoes 9 to be displaced so as to release the belt 3. The fluid pressure, after transmission through the constriction 18, then displaces the piston 28 in the cylinder 8 so as to cause the turntable 1 to undergo an angular step displacement. Thus, in response to the initiating pulse, the brake shoes 9 open until they reach their outermost position, the fluid pressure in the pipe 17 continues to rise and the pressure fluid flows through the constriction 18 into the cylinder 8, so initiating the feed movement of the trolley 6. This feed movement takes place until such time as a control signal is generated. The control signal causes the valve 21 to open, thus releasing the fluid pressure so that the feed movement is immediately interrupted and the brake shoes 9 are drawn together by the spring 10. The control signal is generated in a generator 27 when light from a source 25, which was previously focussed by lens 26 on a photosensitive receiver 23, is interrupted. The interruption may, for example, be caused by a mould 24 carried by the turntable entering the path of a beam of light which was previously incident on the photosensitive receiver 23.

It has been found that the duration of the feed movement can be accurately adjusted to provide angular step displacements of the turntable which are appropriate for moulds of different length, even though the belt 3 may have some irregularities due to it not being perfectly circular, or due to it not being machined accurately.

In the embodiment which has been described, the belt is attached to the turntable. However, other forms of coupling between the belt and the turntable may be employed. For example, the belt may be passed round two rotatable friction drums, of which one is connected to the turntable so as to transmit rotational movement to the turntable and the other is freely rotatable so as to serve as a guide pulley for the loop formed by the belt. In such an arrangement, the clamping members may be applied to any portion of the loop, conveniently, a linear portion, so as to transmit angular displacements to the turntable via the belt.

We claim:

1. A drive arrangement for angularly displacing a turntable comprising in combination:
    a support;
    a turntable rotatably mounted on said support;
    a source of fluid pressure;
    an endless belt coupled to said turntable;
    a cylinder mounted on said support;
    a reciprocally displaceable piston in said cylinder;
    piston return means;
    a trolley;
    wheels adapted to mount said trolley on said support;
    a pair of clamping members individually pivotably mounted on said trolley, said clamping members being individually disposed on respectively opposite sides of said belt;
    coupling means coupling said trolley to said piston;
    said piston being displaced in a first direction in response to said fluid pressure and being displaced in a direction opposite to said first direction by said piston return means;
    said pair of clamping members selectively engaging said belt to cause said turntable to be angularly displaced in response to displacement of said piston in said first direction.

2. An arrangement as defined in claim 1, further comprising at least one rail disposed on said support substantially parallel to a portion of said belt engaged by said pair of clamping members, said wheels engaging said at least one rail to guide said trolley along a predetermined path on said trolley being displaced in response to said displacements of said piston.

3. An arrangement as defined in claim 1, comprising spring means interconnecting said clamping members of said pair and resiliently urging said clamping members of said pair into contact with said belt, each of said clamping members of said pair of clamping members being mutually orientated to be self-locking on said belt when said trolley is displaced in said first direction and to slide freely on said belt when said trolley is displaced opposite said direction.

4. An arrangement as defined in claim 3, wherein each of said clamping members comprises a pivot bearing portion and a contact portion in contact with said belt, said pivot bearing portion of each of said clamping members being nearer said piston than said contact portion of the respective one of said clamping members.

5. An arrangement as defined in claim 1, comprising hydraulically operated braking means to restrain angular displacement of said turntable, said braking means being responsive to said fluid pressure to permit said angular displacement.

6. An arrangement as defined in claim 5, wherein said braking means comprise a pair of individually pivotally mounted brake shoes disposed on opposite sides of said belt and interconnected by spring means to resiliently urge said shoes into contact with said belt.

7. An arrangement as defined in claim 5, comprising a first pipe line connecting said source to said cylinder, a constriction in said pipe line intermediate said source and said cylinder, a further pipe line connected to said first pipe line intermediate said source and said constriction, said further pipe line supplying said fluid pressure to said braking means.

8. An arrangement as defined in claim 7, comprising an electromechanically operated fluid pressure release valve connected to said first pipe line intermediate said source and said constriction, sensing means to sense when said turntable is in any one of a plurality of predetermined angular positions, said release valve opening in response to a control signal from said sensing means when said turntable is located in any one of said predetermined angular positions.

9. An arrangement as defined in claim 8, wherein said sensing means comprises a light source, a photosensitive receiver responsive to light from said light source and means on said turntable to interrupt light from said source, whereby said control signal is generated when said light is interrupted.

10. An arrangement as defined in claim 1, wherein said endless belt is attached to said turntable, said belt being disposed substantially concentrically of the centre of rotation of said turntable.

11. An arrangement as defined in claim 10, wherein said cylinder is pivotally mounted on said support.

12. An arrangement as defined in claim 1, wherein said piston return means comprises a spring coupled to said piston.

References Cited

UNITED STATES PATENTS

| | | | |
|---|---|---|---|
| 2,710,327 | 6/1955 | Powley | 74—128 X |
| 2,947,187 | 8/1960 | Graff et al. | 74—128 U X |
| 3,466,936 | 9/1969 | Gaupin | 74—126 X |

WILLIAM F. O'DEA, Primary Examiner

F. D. SHOEMAKER, Assistant Examiner

U.S. Cl. X.R.

74—165, 166